(12) United States Patent
Kawagoe et al.

(10) Patent No.: US 7,558,088 B2
(45) Date of Patent: Jul. 7, 2009

(54) POWER SUPPLY DEVICE

(75) Inventors: Jun Kawagoe, Numazu (JP); Tsuneaki Endou, Numazu (JP); Mitsuyoshi Shimazaki, Numazu (JP); Mitsugu Koike, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 278 days.

(21) Appl. No.: 11/732,607

(22) Filed: Apr. 4, 2007

(65) Prior Publication Data
US 2007/0236198 A1    Oct. 11, 2007

(30) Foreign Application Priority Data
Apr. 7, 2006    (JP)    ............... 2006-106679

(51) Int. Cl.
*H02M 1/14* (2006.01)
(52) U.S. Cl. ............... 363/41; 363/44; 363/40; 323/209
(58) Field of Classification Search ............. 363/34–41, 363/44–46, 79–82; 323/209–211
See application file for complete search history.

(56) References Cited

U.S. PATENT DOCUMENTS

| | | | | |
|---|---|---|---|---|
| 4,811,236 A | * | 3/1989 | Brennen et al. | ............. 702/64 |
| 5,355,071 A | * | 10/1994 | Ishida et al. | ............. 320/110 |
| 6,317,339 B1 | * | 11/2001 | Shimazaki et al. | ............. 363/37 |
| 6,495,932 B1 | * | 12/2002 | Yoshimizu et al. | ............. 307/150 |
| 7,050,311 B2 | * | 5/2006 | Lai et al. | ............. 363/37 |

FOREIGN PATENT DOCUMENTS

JP    08-033228    2/1996

* cited by examiner

*Primary Examiner*—Rajnikant B Patel
(74) *Attorney, Agent, or Firm*—Pearne & Gordon LLP

(57) ABSTRACT

A power supply device comprises: a voltage converting portion that converts a voltage generated from a power supply portion into an output voltage to be supplied to a load; a voltage divider circuit that generates an output voltage setting signal for providing a set value of the output voltage; a set value changeover portion that turns on/off set value changeover switches to change a voltage divider ratio of the voltage divider circuit to change the set value; a storage device that stores a state appropriate for each set value changeover switch for keeping the value of the output voltage within a specified range; a set value changeover switch control portion that controls the set value changeover switches so as to bring each set value changeover switch into a state as stored in the storage device when the voltage is supplied from the voltage converting portion to the load; and an output voltage control portion that controls the voltage converting portion so as to make zero a deviation between the value of the output voltage and the set value.

8 Claims, 6 Drawing Sheets

POWER SUPPLY DEVICE

TECHNICAL FIELD OF THE INVENTION

The present invention relates to a power supply device having a function of controlling to maintain an output voltage at a set value.

BACKGROUND OF THE INVENTION

When a load is driven by an output of a power supply portion with varying output voltage such as a generator driven by an internal combustion engine, a power supply device is used having a voltage control function of controlling to maintain the output voltage to be supplied to the load at a set value. Such a power supply device is comprised of a voltage converting portion that converts an input voltage supplied from the power supply portion into an output voltage to be supplied to a load, an output voltage setting portion that generates an output voltage setting signal for providing a set value of a voltage value of the output voltage, and an output voltage control portion that controls the voltage converting portion so as to make zero a deviation between the voltage value and the set value of the output voltage.

For example, a known power supply device is shown in FIG. 10 that converts an output voltage of a magneto generator driven by an internal combustion engine into a DC voltage and supplies the DC voltage to a load. This power supply device is disclosed in Japanese Patent Application Laid-Open Publication No. 8-33228. In FIG. 10, a reference numeral 1 denotes a power supply portion constituted by a magnet type AC generator driven by the internal combustion engine, 2 denotes a voltage converting portion that converts an input voltage supplied from the power supply portion 1 into an output voltage to be supplied to a load 3, 4' denotes an output voltage setting portion, and 5 denotes an output voltage control portion that controls the voltage converting portion 2 so as to maintain the output voltage to be supplied to the load 3 at a set value.

The voltage converting portion 2 is comprised of a circuit constituted by two rectifying diodes D1 and D2 and two MOSFETs F1 and F2 bridge-connected, and turns on/off the MOSFETs F1 and F2 to interrupt an armature current flowing through an armature coil 1A of the generator that constitutes the power supply portion 1 and increase an induced voltage of the armature coil. The increased induced voltage of the armature coil is rectified by a full-wave rectifier circuit constituted by the diodes D1 and D2 and the MOSFETs F1 and F2 and supplied to the load 3.

The output voltage setting portion 4' is comprised of a voltage divider circuit 4A having resistances R1 and R2, and divides a constant DC voltage Vcc to generate an output voltage setting signal vs for providing a set value Vs of the output voltage.

The output voltage control portion 5 is comprised of a voltage detecting portion 5A, a drive signal generation circuit 5B, and a drive signal supply control portion 5C. The voltage detecting portion 5A is constituted by a voltage divider circuit having resistances R3 and R4, and detects an output voltage V1 obtained from the voltage converting portion 2 to generate a voltage detecting signal v1. The drive signal generation circuit 5B generates rectangular wave drive signals Vq provided to gates of the MOSFETs F1 and F2, and simultaneously provides the drive signals Vq to the MOSFETs F1 and F2 to simultaneously turn on/off the MOSFETs F1 and F2. The drive signal supply control portion 5C controls provision of the drive signals Vq from the drive signal generation circuit 5B to the MOSFETs F1 and F2 so as to make zero a deviation between the voltage value V1 of the output voltage detected by the voltage detecting signal v1 output from the voltage detecting portion 5A and the set value Vs of the output voltage provided by the output voltage setting signal vs.

The shown drive signal supply control portion 5C comprises a comparator CMP that compares the voltage detecting signal v1 with the setting signal vs, and controls the drive signal generation circuit 5B according to a magnitude relationship between the voltage detecting signal v1 and the setting signal vs.

The drive signal generation circuit 5B generates the rectangular wave signals Vq having a predetermined duty to simultaneously turn on/off the MOSFETs F1 and F2 at the predetermined duty when the voltage detecting signal v1 is lower than the output voltage setting signal vs and an output of the comparator CMP is at a high level, and sets the duty of the rectangular wave signals Vq to 100% (with the drive signals at a constant level being still provided to the gates of the MOSFETs F1 and F2) to maintain both the MOSFETs F1 and F2 in an ON state when the voltage detecting signal v1 becomes higher than the output voltage setting signal vs and the output of the comparator CMP is reduced to a low level.

When the MOSFETs F1 and F2 are simultaneously turned on, the armature coil 1A is short-circuited through the MOSFETs F1 and F2, and thus the armature current flows through the armature coil 1A. When the MOSFETs F1 and F2 are both turned off, the armature current having been flowing is interrupted, and thus an increased voltage is induced in the armature coil 1A. Thus, when the voltage detecting signal v1 is lower than the output voltage setting signal vs and the MOSFETs F1 and F2 are repeatedly turned on/off, the increased voltage is induced in the armature coil 1A every time the MOSFETs F1 and F2 are turned off, and the voltage is supplied to the load 3 through the full-wave rectifier circuit constituted by the diodes D1 and D2 and the MOSFETs F1 and F2 of the voltage converting portion 2.

When the output voltage V1 supplied from the voltage converting portion 2 to the load 3 exceeds the set value Vs, and the voltage detecting signal v1 exceeds the output voltage setting signal vs, the output of the comparator CMP is reduced to the low level. At this time, the drive signal generation circuit 5B has a duty of 100% of the drive signal provided to the MOSFETs F1 and F2. Thus, the armature coil 1A is maintained in a short-circuited state through the MOSFETs F1 and F2 to reduce the output voltage V1. Repeating these operations maintains the voltage value of the output voltage V1 to be supplied to the load 3 at around the set value.

As described above, the MOSFETs F1 and F2 are turned on/off to interrupt the armature current of the generator to induce the increased voltage in the armature coil, and rectify the increased voltage and supply the voltage to the load. This allows a high output voltage to be obtained during low speed rotation of the generator even with a reduced number of turns of the armature coil 1A. The reduced number of turns of the armature coil 1A can reduce impedance thereof, thereby allowing a high load current to be passed during high speed rotation of the generator.

In the power supply device as described above, variations in resistance values of the resistances R1 to R4 cause variations in values of the output voltage V1 supplied from the voltage converting portion 2 to the load 3. Thus, in order to keep the voltage value of the output voltage V1 of the power supply device within a specified range, adjustment of the resistance values of the resistors R1 to R4 or replacement of any of the resistors R1 to R4 is required when it is detected that the output voltage V1 falls outside the specified range in a test conducted in a test step in a production process of the power supply device, which requires further man-hours for adjustment of the output voltage and increases production costs.

High accuracy resistors with small variations in resistance value may be used as the resistors R1 to R4, but the high accuracy resistor is very expensive and use thereof increases costs of the power supply device.

An allowable range of variations in output voltage of the power supply device may be increased to some extent, but when the characteristic of the load 3 is changed according to the power supply voltage, control items of the load need to be corrected according to the value of the output voltage of the power supply device in a control device that controls the load 3, which is troublesome.

For example, when the load is an injector (a fuel injection valve that injects fuel to be supplied to the engine), ineffective injection time (delay time from when an injection command signal is provided to an injector drive circuit to when fuel injection is actually started) of the injector changes according to the power supply voltage. In a certain injector, ineffective injection time when a driving voltage is 14.0 V is 1000 μsec, while the ineffective injection time becomes 1150 μsec when the driving voltage decreases to 13.6 V. In this case, if signal widths of injection command signals provided to the injector are equalized, the ineffective injection time is increased when the power supply voltage is low, thereby reducing actual injection time and causing insufficient amount of fuel to be supplied to the engine. In order to prevent this, the ineffective injection time needs to be corrected according to the power supply voltage in the control device that controls the injector, which is troublesome. Particularly, when an inexpensive CPU without a dividing function is used in the control device, the correction cannot be properly performed in some cases.

The power supply device is shown in FIG. 10 as an example in which chopper control of the armature current is performed to induce the increased voltage in the armature coil, thereby obtaining the voltage for driving the load without increasing the number of turns of the armature coil of the generator. However, the same problem occurs in a power supply device of other type in which a set value of an output voltage is determined by a resistor, for example, a power supply device in which a voltage setting resistor is connected to a regulator IC to obtain a voltage adjusted to a predetermined set value, because variations in resistance values of the voltage setting resistor cause variations in output voltage.

SUMMARY OF THE INVENTION

An object of the present invention is to provide a power supply device that can keep a voltage value of an output voltage within a specified range without adjustment of resistance values of a resistor that determines a set value of the output voltage and a resistor that constitutes a detection circuit of the output voltage.

The present invention is applied to a power supply device comprising:

an output voltage setting portion that generates an output voltage setting signal for providing a set value of an output voltage; and an output voltage control portion that controls to maintain a voltage value of the output voltage at the set value.

In the present invention, the output voltage setting portion comprises:

a set value changeover portion that has a plurality of set value changeover switches and turns on/off the set value changeover switches to change the set value of the output voltage; a storage device that stores information indicating an ON/OFF state appropriate for each set value changeover switch for keeping the voltage value of the output voltage within a specified range; and a set value changeover switch control portion that controls the set value changeover switches so as to bring each set value changeover switch into a state as indicated by the information stored in the storage device when the output voltage is supplied to the load.

In a preferred aspect of the present invention, the output voltage setting portion has a resistor in which a resistance value is adjusted in adjustment of the set value of the output voltage. In this case, the set value changeover portion is comprised so as to turn on/off the plurality of set value changeover switches to change the resistance value of the resistor to change the set value of the output voltage.

In a preferred aspect of the present invention, a voltage converting portion is provided that converts an input voltage supplied from a power supply portion into the output voltage to be supplied to the load. In this case, the set value changeover switch control portion is comprised so as to control the set value changeover switches so as to bring each set value changeover switch into a state as indicated by the information stored in the storage device when the voltage is supplied from the voltage converting portion to the load.

Comprised as described above, in a test step in a production process of the power supply device, when the voltage value of the output voltage falls outside the specified range, the voltage value of the output voltage can be kept within the specified range simply by calculating the ON/OFF state appropriate for each set value changeover switch for keeping a deviation between the voltage value and the set value of the output voltage within an allowable range, and storing the information indicating the ON/OFF state. This can reduce labor for adjustment and production costs as compares with the case where adjustment of a resistance value of a resistor or replacement of the resistor is performed.

The ON/OFF state appropriate for each set value changeover switch for keeping the deviation between the voltage value and the set value of the output voltage within the allowable range can be easily calculated by turning on/off each set value changeover switch according to an actual measured value of the output voltage and checking a change in the output voltage, and the process of calculating the ON/OFF state appropriate for each set value changeover switch can be easily automated.

In actual use of the power supply device, the set value changeover switch control portion brings each set value changeover switch into the state as indicated by the information stored in the storage device, and changes the set value so as to keep the voltage value of the output voltage within the specified range (keep the deviation between the voltage value and the set value of the output voltage within the allowable range), thereby allowing the load to be driven in a state where a variation range of the output voltage is kept within the specified range.

In a preferred aspect of the present invention, the output voltage setting portion comprises: a voltage divider circuit that has an upper resistance and a lower resistance connected in series, and divides a constant DC voltage obtained from a constant-voltage power supply circuit to generate an output voltage setting signal for providing a set value of a voltage value of the output voltage; a set value changeover portion that has a plurality of set value changeover switches and turns on/off the plurality of set value changeover switches to change a voltage divider ratio of the voltage divider circuit to a different value to change the set value; a storage device that stores information indicating an ON/OFF state appropriate for each set value changeover switch for keeping the voltage value of the output voltage within a specified range; and a set value changeover switch control portion that controls the set value changeover switches so as to bring each set value changeover switch into a state as indicated by the information stored in the storage device when the voltage is supplied from the voltage converting portion to the load.

In a preferred aspect of the present invention, each set value changeover switch provided in the set value changeover portion is connected in parallel with the upper resistance or the lower resistance of the voltage divider circuit through an impedance element having a resistance component.

In another preferred aspect of the present invention, each set value changeover switch provided in the set value changeover portion is connected in parallel with a part of the upper resistance or a part of the lower resistance of the voltage divider circuit, and each set value changeover switch is turned on/off to change a resistance value of the upper resistance or a resistance value of the lower resistance of the voltage divider circuit.

The voltage converting portion may be comprised of a diode bridge full-wave rectifier circuit constituted by n (n is an integer equal to or more than 2) rectifying diodes and n MOSFETs bridge-connected, the n rectifying diodes being placed on one of an upper side and a lower side of a bride and the n MOSFETs being placed on the other.

In this case, the output voltage control portion may be comprised so as to simultaneously provide, to gates of the MOSFETs, rectangular wave drive signals having a duty that changes according to a deviation between the voltage value and the set value of the output voltage obtained from the voltage converting portion so as to make the deviation zero, and simultaneously turn on/off the n MOSFETs.

As described above, according to the present invention, the output voltage setting portion comprises the set value changeover portion that has the plurality of set value changeover switches and turns on/off the set value changeover switch to change the set value, the storage device that stores the information indicating the ON/OFF state appropriate for each set value changeover switch for keeping the deviation between the voltage value and the set value of the output voltage within the allowable range, and the set value changeover switch control portion that controls the set value changeover switches so as to bring each set value changeover switch into the state as indicated by the information stored in the storage device when the voltage is supplied from the voltage converting portion to the load. Thus, in a test step in a production process of the power supply device, when the voltage value of the output voltage falls outside the specified range, the ON/OFF state appropriate for each set value changeover switch for keeping the deviation between the voltage value and the set value of the output voltage within the allowable range may be simply calculated to store the information indicating the ON/OFF state in the storage device. There is no need for adjustment of the resistance value of the resistor or replacement of the resistor, thereby reducing labor for adjustment in the test step in the production process and production costs.

According to the present invention, in the actual use of the power supply device, the set value changeover switch control portion brings each set value changeover switch into the state as indicated by the stored information, and changes the set value so as to keep the voltage value of the output voltage within the specified range, thereby allowing the load to be driven in a state where a variation range of the output voltage is kept within the specified range.

BRIEF DESCRIPTION OF THE DRAWINGS

The above and other objects and features of the present invention will be apparent from the detailed description of the preferred embodiments of the invention, which is described and illustrated with reference to the accompanying drawings, in which.

DETAILED DESCRIPTION OF THE PREFERRED EMBODIMENTS

Figure 1:
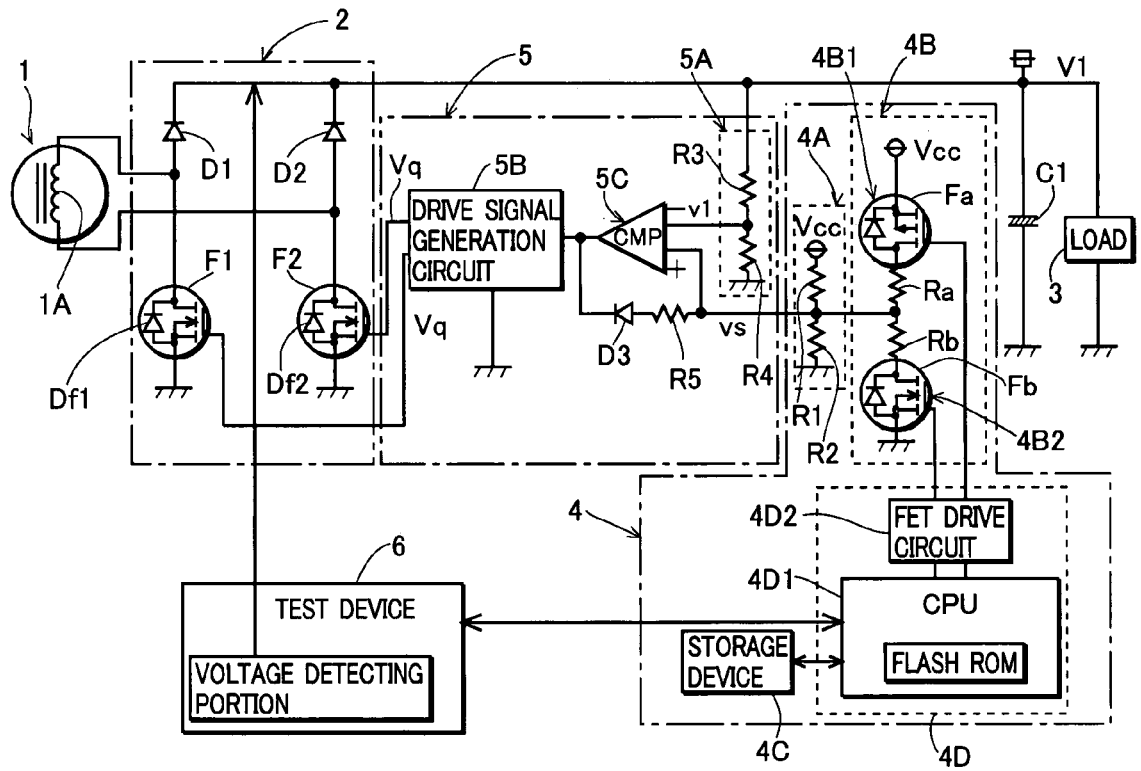
FIG. 1 is a schematic circuit diagram of a construction of a first embodiment of the present invention.
Figure 2:
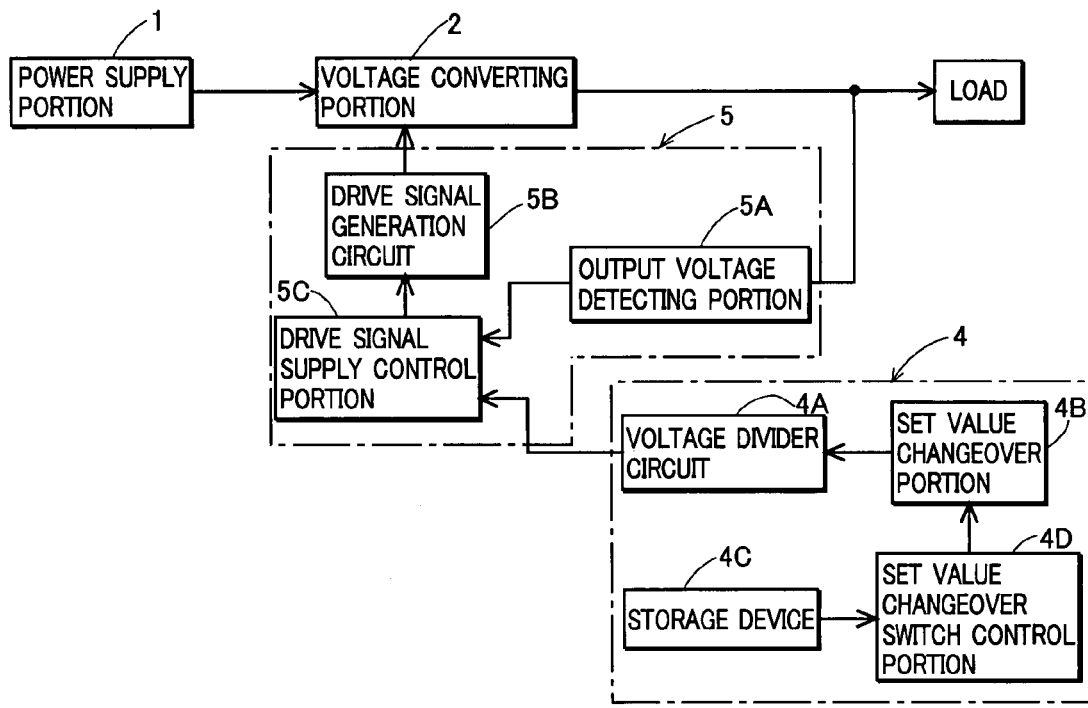
FIG. 2 is a block diagram of the construction of the first embodiment of the present invention.

Now, preferred embodiments of the present invention will be described in detail with reference to the drawings. FIG. 1 shows a first embodiment of a power supply device according to the present invention. In FIG. 1, a reference numeral 1 denotes a power supply portion constituted by a magnet type AC generator driven by an internal combustion engine, 2 denotes a voltage converting portion that converts an input voltage supplied from the power supply portion 1 into an output voltage to be supplied to a load 3, 4 denotes an output voltage setting portion, 5 denotes an output voltage control portion that controls the voltage converting portion 2 so as to maintain the output voltage to be supplied to the load 3 at a set value, and C1 denotes a smoothing capacitor connected to an output end of the power supply device. FIG. 2 is a block diagram of a construction of the power supply device in FIG. 1.

Figure 10:
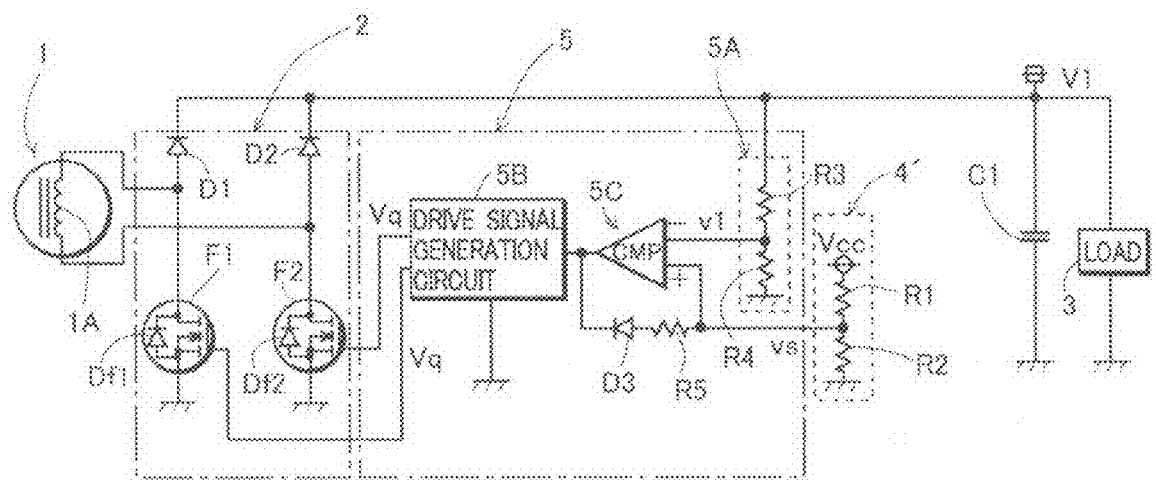
FIG. 10 is a schematic circuit diagram of an exemplary construction of a conventional power supply device.

As in a conventional example in FIG. 10, the voltage converting portion 2 is comprised of a bridge type full-wave rectifier circuit constituted by two rectifying diodes D1 and D2 and two MOSFETs F1 and F2 bridge-connected, the rectifying diodes D1 and D2 being placed on an upper side of the bridge and the MOSFETs F1 and F2 being placed on a lower side of the bridge. The diodes Df1 and Df2 are parasitic diodes formed between drain and source of the MOSFETs F1 and F2.

In the present invention, the output voltage setting portion 4 is comprised of a voltage divider circuit 4A, a set value changeover portion 4B, a storage device 4C, and a set value changeover switch control portion 4D.

In more detail, the voltage divider circuit 4A is constituted by an upper resistance R1 and a lower resistance R2 connected in series, and a constant DC voltage Vcc obtained from an unshown constant-voltage power supply circuit is applied across the circuit. The voltage divider circuit 4A divides the constant DC voltage Vcc and outputs an output voltage setting signal vs for providing a set value of an output voltage.

The set value changeover portion 4B comprises a plurality of (two in the shown example) set value changeover switches 4B1 and 4B2 and turns on/off the set value changeover switches 4B1 and 4B2 to change a set value. Each set value changeover switch is connected in parallel with the upper resistance R1 or the lower resistance R2 of the voltage divider circuit 4A through an impedance element having a resistance component. In the shown example, the set value changeover switch 4B1 is connected in parallel with the upper resistance R1 of the voltage divider circuit 4A through a resistance Ra, and the set value changeover switch 4B2 is connected in parallel with the lower resistance R2 of the voltage divider circuit through a resistance Rb.

In the shown example, the set value changeover switches 4B1 and 4B2 are constituted by MOSFETs. A drain of the MOSFET that constitutes the set value changeover switch 4B1 is connected to a positive electrode output terminal of the unshown constant-voltage power supply circuit, and a source of the MOSFET is connected to a voltage dividing point of the voltage divider circuit 4A through the resistance Ra. A drain of the MOSFET that constitutes the set value changeover switch 4B2 is connected to the voltage dividing point of the voltage divider circuit 4A through the resistance Rb, and a source thereof is grounded.

The set value changeover portion 4B operates as described below to change the set value of the output voltage. Specifically, when the set value changeover switches 4B1 and 4B2 are both in an OFF state, the resistances Ra and Rb are separated from the voltage divider circuit 4A, and thus the voltage divider circuit 4A divides the voltage Vcc by a voltage divider ratio determined by the upper resistance R1 and the lower resistance R2 and outputs the output voltage setting signal vs.

On the other hand, when the set value changeover switch 4B1 is in an ON state, and the set value changeover switch 4B2 is in the OFF state, the resistance Ra is connected in parallel with the resistance R1, and thus the output voltage setting signal vs is changed to have a larger value than that when the set value changeover switches 4B1 and 4B2 are both in the OFF state.

When the set value changeover switch 4B2 is in the ON state, and the set value changeover switch 4B1 is in the OFF state, the resistance Rb is connected in parallel with the resistance R2, and thus the output voltage setting signal vs is changed to have a smaller value than that when the set value changeover switches 4B1 and 4B2 are both in the OFF state.

In the embodiment, it is supposed that the load 3 includes a battery, and the battery is charged to 14.0 V. Thus, a specified value of the output voltage V1 is 14.0 V. In this case, resistance values of the resistances R1 and R2 are set so that the set value of the output voltage is 14.0 V when the set value changeover switches 4B1 and 4B2 are both in the OFF state.

In the embodiment, a range of ±0.1 V of the specified value of the output voltage is a first specified range of the output voltage V1, and when the output voltage falls within the first specified range, a product satisfies the standard and acceptance is determined. On the other hand, when the output voltage V1 falls outside the first specified range but within an allowable error range (a range of ±0.5 V of the specified value), any of the set value changeover switches 4B1 and 4B2 is turned on to shift the output voltage V1 by 0.3 V, and keep the output voltage within a second specified range (a range of ±0.2 V of the specified value of 14.0 V), and rejection is determined when the output voltage falls outside the allowable error range.

Specifically, the resistance values of the resistances Ra and Rb are set so that when the set value changeover switch 4B1 is turned on, and the set value changeover switch 4B2 is turned off, the set value of the output voltage is increased by 0.3 V as compared with when the switches are both in the OFF state, and when the set value changeover switch 4B2 is turned on, and the set value changeover switch 4B1 is turned off, the set value of the output voltage is reduced by 0.3 V as compared with when the switches are both in the OFF state.

The storage device 4C is constituted by a rewritable non-volatile memory such as a flash memory or an EEPROM, and stores information indicating an ON/OFF state appropriate for each set value changeover switch for keeping the voltage value V1 of the output voltage within the specified range in a product test conducted in a final step of the production process of the power supply device.

The set value changeover switch control portion 4D controls the set value changeover switches 4B1 and 4B2 so as to bring the set value changeover switches 4B1 and 4B2 into states as stored in the switch state storage device 4C when the power supply portion 1 is operated to actually supply a voltage from the voltage converting portion 2 to the load 3 (when the power supply device is operated). In the embodiment, the set value changeover switch control portion 4D is comprised of a microprocessor 4D1, and an FET drive circuit 4D2 that provides drive signals (signals for turning on the MOSFETs) to the gates of the MOSFETs that constitute the set value changeover switches 4B1 and 4B2 according to commands provided from the microprocessor 4D1.

The output voltage control portion 5 is comprised of a voltage detecting portion 5A, a drive signal generation circuit 5B, and a drive signal supply control portion 5C.

The voltage detecting portion 5A is constituted by a series circuit of resistances R3 and R4, across which the output voltage V1 obtained from the voltage converting portion 2 is applied, divides the output voltage V1, and generates a detecting signal voltage v1 proportional to the output voltage V1 across the resistance R4.

The drive signal generation circuit 5B provides rectangular wave drive signals Vq of the same phase to the gates of the MOSFETs F1 and F2 so as to simultaneously turn on/off the MOSFETs F1 and F2. The drive signal supply control portion 5C is comprised so as to control provision of the drive signals Vq to the MOSFETs F1 and F2 according to a deviation between the voltage value V1 of the output voltage detected by the voltage detecting signal v1 output from the voltage detecting portion 5A and the set value Vs provided by the output voltage setting signal vs output from the voltage divider circuit 4A so as to make the deviation zero.

The shown drive signal supply control portion 5C is comprised of a voltage comparator CMP having a reverse input terminal and a non-reverse input terminal to which the voltage detecting signal v1 and the setting signal vs, respectively, are input, and a diode D3 and a resistance R5 connected between the non-reverse input terminal and an output terminal of the comparator CMP. The comparator CMP compares the voltage detecting signal v1 with the setting signal vs, and sets the output to a low level when the voltage detecting signal v1 becomes higher than the setting signal vs, and sets the output to a high level when the voltage detecting signal v1 is equal to or lower than the setting signal vs.

The drive signal generation circuit 5B generates a rectangular wave signal Vq having a predetermined duty (for example, of 50%) when the output of the comparator CMP is at a high level, simultaneously turns on/off the MOSFETs F1 and F2, and sets the duty of the rectangular wave signal Vq to 100% to maintain both the MOSFETs F1 and F2 in the ON state when the output of the comparator CMP is at a low level.

In the voltage converting portion 2, when the MOSFETs F1 and F2 are simultaneously turned on, an armature coil 1A is short-circuited through the MOSFETs F1 and F2, and thus an armature current flows through the armature coil 1A. When the MOSFETs F1 and F2 are both turned off, the armature current having been flowing is interrupted, and thus an increased voltage is induced in the armature coil 1A. Thus, when the MOSFETs F1 and F2 are repeatedly turned on/off, an increased pulse wave voltage is induced in the armature coil 1A every time the MOSFETs are turned off, and the voltage is supplied to the load 3 as a DC voltage through the full-wave rectifier circuit constituted by the diodes D1 and D2 and MOSFETs F1 and F2. When the output voltage V1 supplied from the voltage converting portion 2 to the load 3 exceeds the set value Vs, the output of the comparator CMP is reduced to a low level, and the duty of the drive signal generated by the drive signal generation circuit 5B becomes 100%. Thus, the armature coil 1A is maintained in a short-circuited state through the MOSFETs F1 and F2 to reduce the output voltage V1. These operations are repeated to maintain the voltage value of the output voltage V1 supplied to the load 3 at around the set value.

As described above, the MOSFETs F1 and F2 are turned on/off to interrupt the armature current of the generator to induce the increased voltage in the armature coil, and rectify the increased voltage and supply the voltage to the load. This allows a high output voltage to be obtained during low speed rotation of the generator even with a reduced number of turns of the armature coil 1A. The reduced number of turns of the armature coil 1A can reduce impedance thereof, thereby allowing a high load current to be flowed during high speed rotation of the generator.

In production of the power supply device according to the present invention, in the test step, a test device 6 is connected to the power supply device, and a process is performed of calculating the states appropriate for the set value changeover switches 4B1 and 4B2 for keeping the output voltage V1 within the specified range, and the result is stored in the switch state storage device 4C through the microprocessor 4D1.

The test device 6 is comprised of a voltage detecting portion that detects the output voltage V1 of the voltage converting portion 2, and means for communication with the microprocessor 4D1. The test device 6 detects the output voltage V1 of the voltage converting portion 2 by a command from the microprocessor 4D1, and turns on any of the set value changeover switches 4B1 and 4B2 according to the output voltage being higher or lower than the specified value when the detected output voltage V1 falls outside the first specified range (the range of ±0.1 V of the specified value) but within the allowable error range (the range of ±0.5 V of the specified value).

Specifically, the test device 6 turns on the set value changeover switch 4B1 when the output voltage V1 is lower than the specified value by the first specified range or more, turns on the set value changeover switch 4B2 when the output voltage V1 is higher than the specified value by the specified range or more, and confirms whether the output voltage falls within the specified range. When the output voltage V1 falls within the specified range, the state of each set value changeover switch (the ON or OFF state) at that time is stored in the storage device 4C.

When the power supply device is operated, the microprocessor 4D1 brings the set value changeover switches 4B1 and 4B2 into the states as stored in the storage device 4C, and thus the output voltage V1 within the specified range is output from the power supply device, thereby preventing the voltage applied to the load from being excessive or insufficient.

Figure 6:
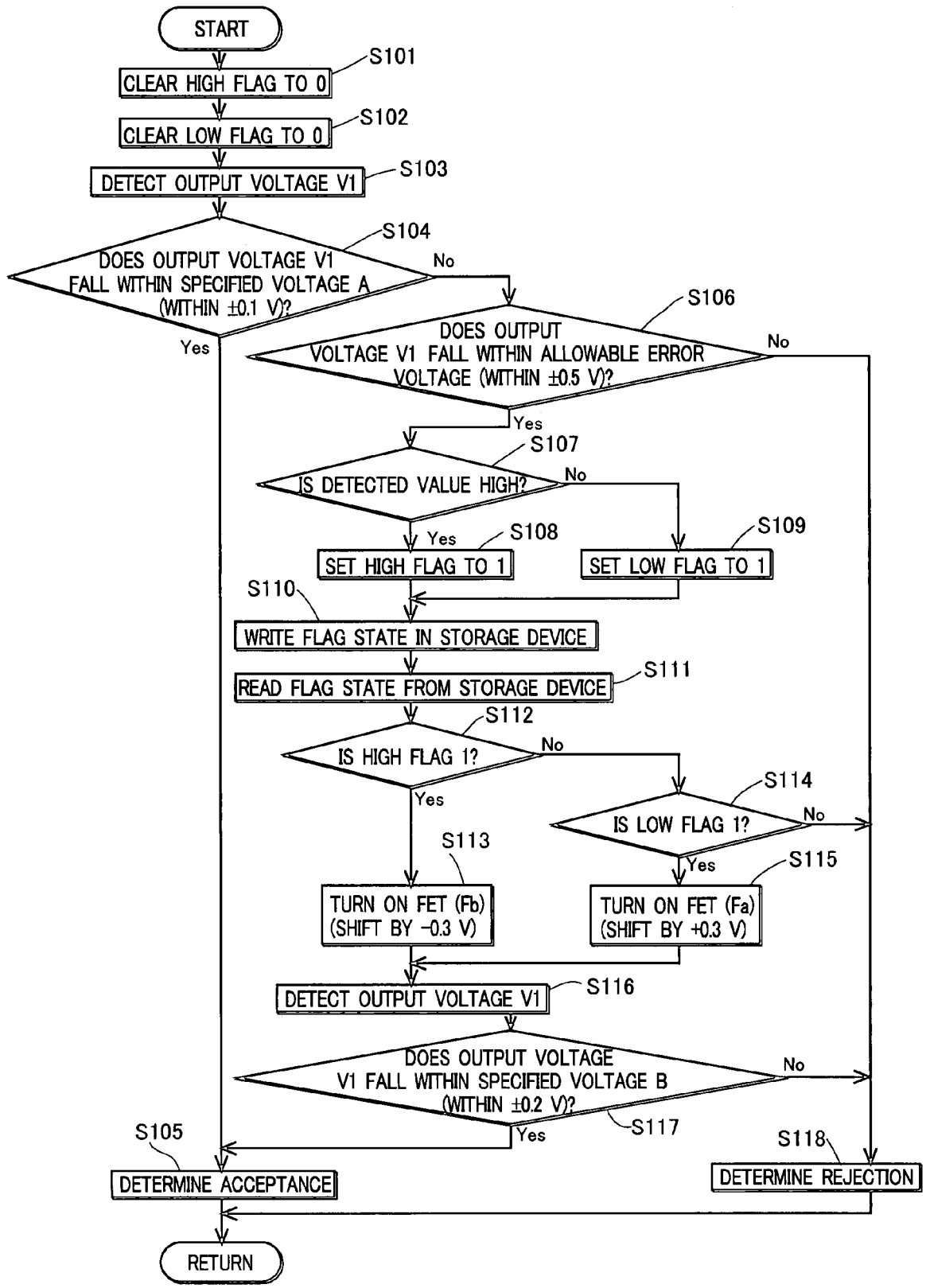
FIG. 6 is a flowchart of an algorithm of a program executed by a microprocessor in a test step of a product in the embodiment of the present invention.

FIG. 6 is an example of a flowchart of an algorithm of a program executed by the microprocessor 4D1 in the test step performed in the production process of the power supply device. According to the algorithm, first in Step S101, a High flag is cleared to 0, and in Step S102, a Low flag is cleared.

The High flag indicates that the detected output voltage V1 is higher than the specified value (14.0 V) by a dead zone (0.1 V) or more, and is set to 1 when the detected output voltage V1 is higher than the specified value by the dead zone or more. The Low flag indicates that the detected output voltage V1 is lower than the specified value (14.0 V) by the dead zone (0.1 V) or more, and is set to 1 when the detected output voltage V1 is lower than the specified value by the dead zone or more.

Then, the output voltage V1 is read in Step S103. It is determined in Step S104 whether the output voltage V1 falls within the specified value (within ±0.1 V). When the output voltage falls within the specified value, acceptance is determined in Step S105, and the processing is finished.

When it is determined in Step S104 that the output voltage V1 falls outside the specified voltage, the process proceeds to Step S106, and it is determined whether the output voltage V1 falls within an allowable error voltage (a range of ±0.5 V of the specified value). When it is determined that the output voltage falls within the allowable error voltage, the process proceeds to Step S107, and it is determined whether the detected value of the output voltage V1 is higher than the specified voltage. When it is determined that the detected value of the output voltage V1 is higher than the specified voltage, the process proceeds to Step S108 and the High flag is set to 1. When it is determined that the detected value of the output voltage V1 is lower than the specified voltage, the process proceeds to Step S109 and the Low flag is set to 1. After the processing in Step S108 or S109, a state of each flag is written in the storage device 4C in Step S110.

Then, the state of the flag is read from the storage device 4C in Step S111, and it is determined in Step S112 whether the High flag is set to 1. When the High flag is set to 1, in Step S113, the set value changeover switch 4B2 (MOSFET Fb) is turned on to shift the output voltage V1 by −0.3 V. When it is determined in Step S112 that the High flag is not set to 1, it is determined in Step S114 whether the Low flag is set to 1. When the Low flag is set to 1, in Step S115, the set value changeover switch 4B1 (MOSFET Fa) is turned on to shift the output voltage V1 by +0.3 V.

After the output voltage is shifted by −0.3 V or +0.3 V in Step S113 or S115, the detected value of the output voltage V1 is read in Step S116. When it is determined in Step S117 that the output voltage V1 falls within a second specified range (a range of ±0.2 V of the specified value), the process proceeds to Step S105, acceptance is determined, and the processing is finished.

When it is determined in Step S106 that the output voltage exceeds the allowable error range, when it is determined in Step S114 that the Low flag is not set to 1, and when it is determined in Step S117 that the output voltage falls outside the second specified range, the process proceeds to Step S118, rejection of the product is determined, and the processing is finished.

Figure 7:
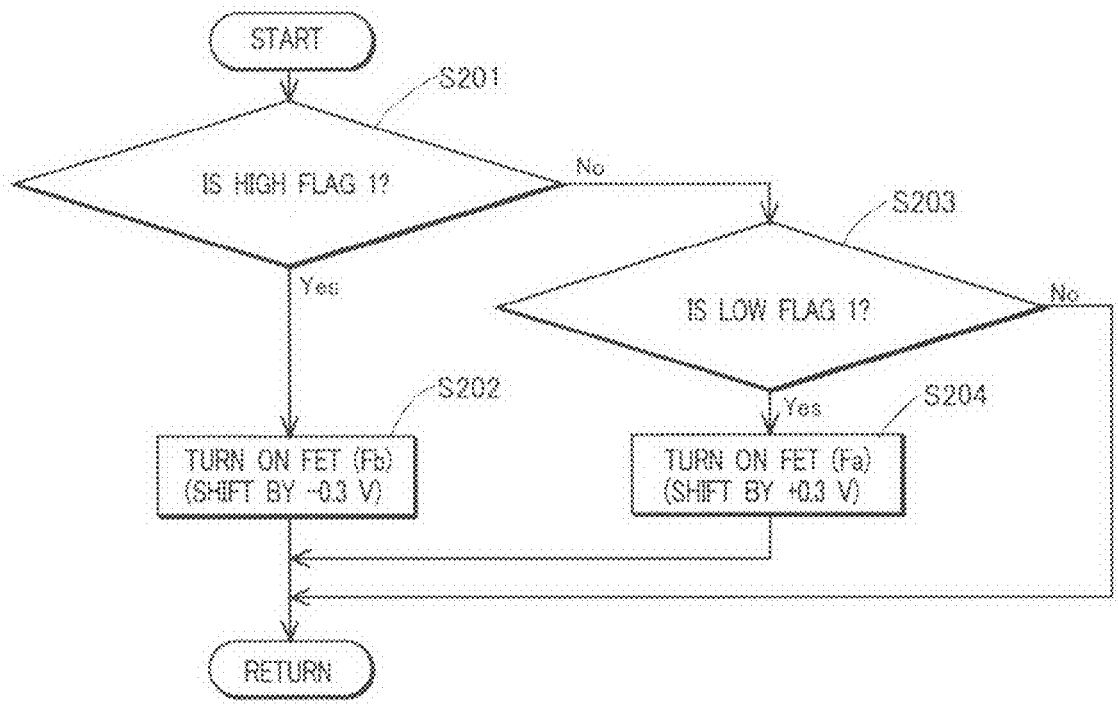
FIG. 7 is a flowchart of an algorithm of a program executed by the microprocessor in driving a power supply device in the embodiment of the present invention.

FIG. 7 shows an algorithm of a program executed by the microprocessor 4D1 when the operation of the power supply device is started. According to the algorithm, it is determined in Step S201 whether the High flag is 1. When it is determined that the High flag is 1, in Step S202, the MOSFET Fb (the set value changeover switch 4B2) is turned on, and the processing is finished. When it is determined in Step S201 that the High flag is not 1, the process proceeds to Step S203, and it is determined whether the Low flag is 1. When it is determined that the Low flag is 1, the process proceeds to Step S204, the MOSFET Fa (the set value changeover switch 4B1) is turned on, and the processing is finished. When it is determined in Step S203 whether the Low flag is not set to 1 (when the output voltage falls within the first specified range (the range ±0.1 V of the specified value)), the processing is finished without performing any processing.

By the above processing, when the output voltage falls within the range of ±0.3 to 0.5 V of the specified value, any of the set value changeover switches 4B1 and 4B2 is turned on, thereby allowing the output voltage to be kept within the range of ±0.2 V of the specified value.

Figure 8:
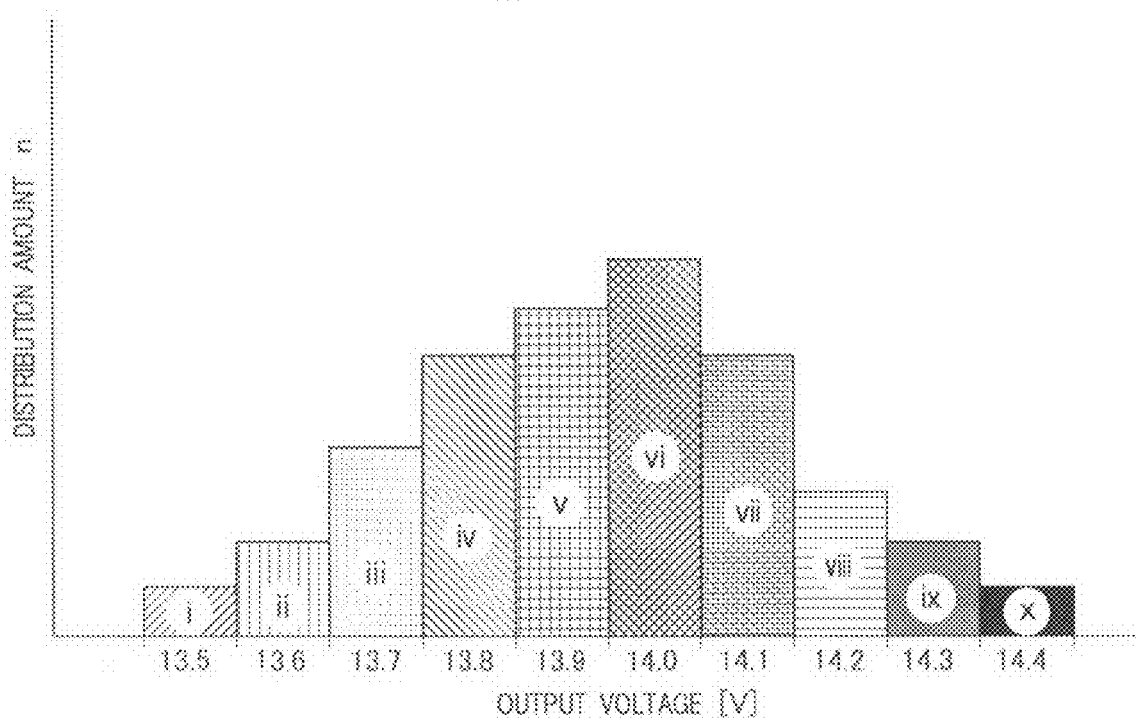
FIG. 8 is a histogram of distribution of an output voltage of a power supply device before application of the present invention.

FIG. 8 shows an example of distribution of an output voltage of a power supply device before application of the present invention. In FIG. 8, an output voltage is indicated on the axis of abscissa, and a distribution amount n is indicated on the axis of ordinate. In FIG. 8, i, ii, . . . , x indicate the cases where the output voltage is 13.5 V, 13.6 V, . . . , 14.4 V, respectively. As is apparent from FIG. 8, before the application of the present invention, the output voltage of the power supply device varies in a wide range from 13.5 V to 14.4 V.

Figure 9:
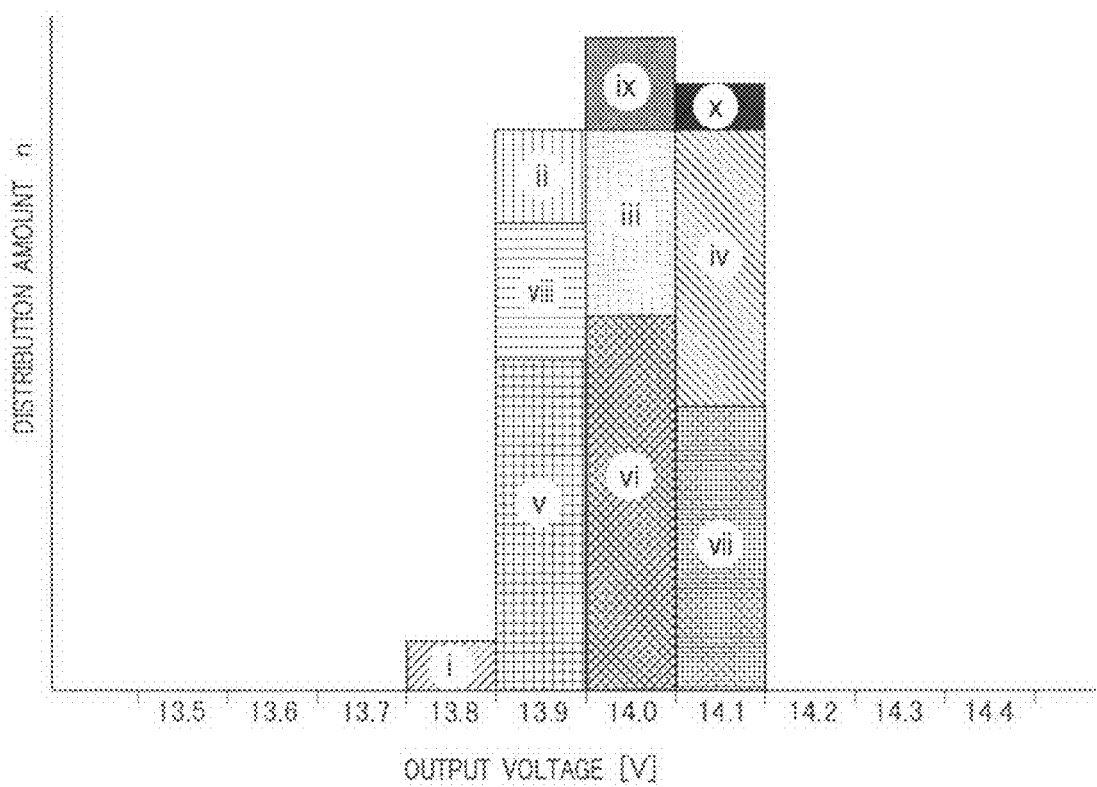
FIG. 9 is a histogram of distribution of the output voltage of the power supply device after the application of the present invention.

On the other hand, FIG. 9 shows distribution of an output voltage after the application of the present invention to the same power supply device as one used in a test for measuring the distribution in FIG. 8. The output voltage V1 can be kept within ±0.2 V of the specified value 14.0 V.

In the embodiment, each set value changeover switch provided in the set value changeover portion 4B is connected in parallel with the upper resistance or the lower resistance of the voltage divider circuit through a fixed resistor, but each set value changeover switch may be connected in parallel with the upper resistance or the lower resistance of the voltage divider circuit through an impedance element having a resistance component, and is not limited to the above described construction.

Figure 3:
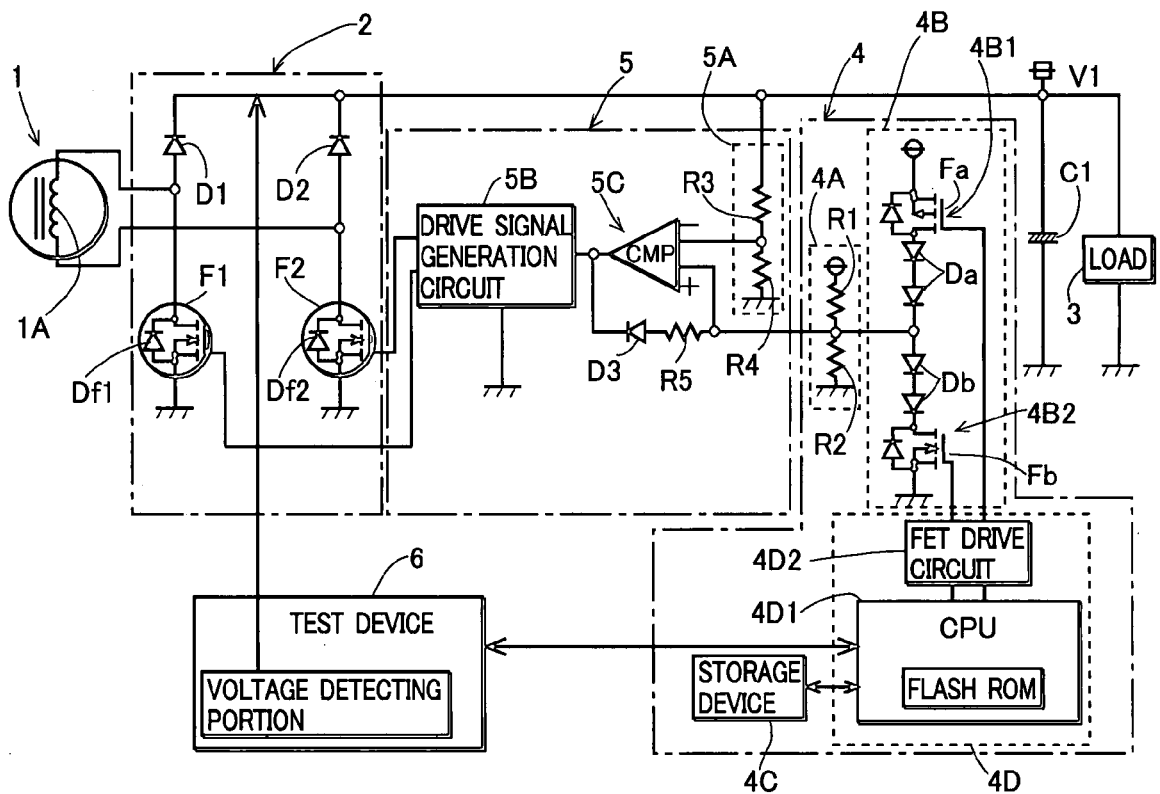
FIG. 3 is a schematic circuit diagram of a construction of a second embodiment of the present invention.

For example, as shown in FIG. 3, the set value changeover switch 4B1 may be connected in parallel with the upper resistance Ra of the voltage divider circuit 4A through an impedance element for changing a voltage divider ratio constituted by a predetermined number of diodes Da connected in series, and the set value changeover switch 4B2 may be connected in parallel with the lower resistance Rb of the voltage divider circuit 4A through an impedance element for changing a voltage divider ratio constituted by a predetermined number of diodes Db connected in series. Other constructions of the embodiment in FIG. 3 are the same as in the embodiment in FIG. 1.

In the embodiment, the set value changeover switches are connected, through the impedance elements, in parallel with the upper resistance and the lower resistance of the voltage divider circuit that generates the output voltage setting signal. However, the set value changeover portion 4B may be comprised so as to turn on/off the set value changeover switches to change the voltage divider ratio of the voltage divider circuit, and the construction thereof is not limited to that in the embodiment.

For example, each set value changeover switch provided in the set value changeover portion 4B may be connected in parallel with a part of the upper resistance or a part of the lower resistance of the voltage divider circuit 4A, and turned on/off to change the resistance value of the upper resistance or the resistance value of the lower resistance of the voltage divider circuit.

Figure 4:
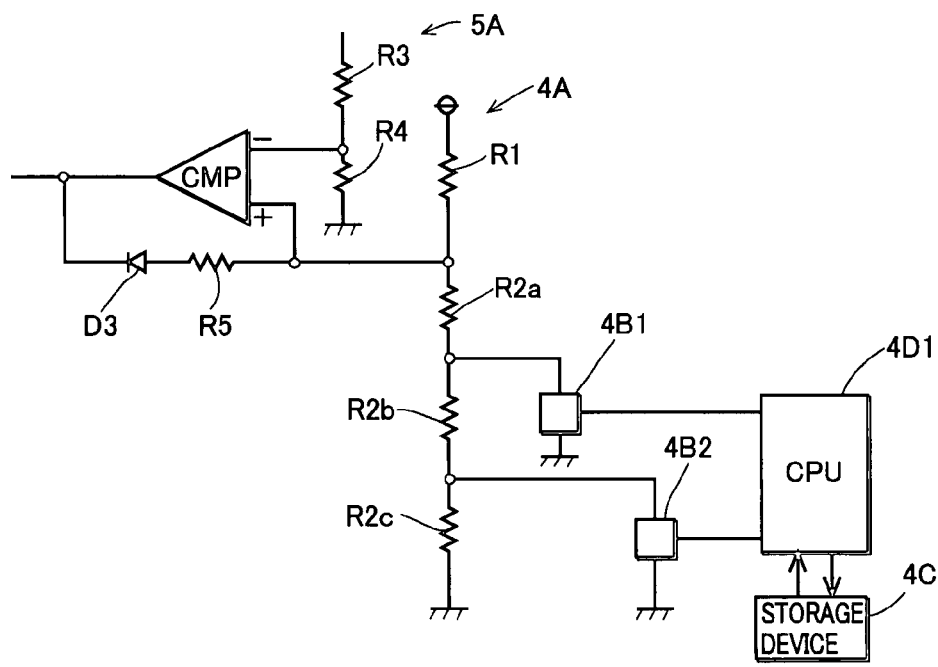
FIG. 4 is a schematic circuit diagram of a construction of essential portions of a third embodiment of the present invention.

For example, as shown in FIG. 4, the lower resistance of the voltage divider circuit 4 may be constituted by first to third resistors R2a to R2c connected in series, the set value changeover switch 4B1 may be connected in parallel with a series circuit of the second resistor R2b and the third resistor R2c, and the set value changeover switch 4B2 may be connected in parallel with the third resistor R2c.

Comprised as in FIG. 4, when the switch 4B2 is turned on and the switch 4B1 is turned off, an output voltage setting signal that provides a set value corresponding to the specified value can be output from the voltage divider circuit. When the switch 4B1 is turned on, the set value can be shifted, for example, by −0.3 V, and when both the switches 4B1 and 4B2 are turned off, the set value can be shifted, for example, by +0.3 V.

A plurality of set value changeover switches may be connected in parallel with the upper resistance and/or the lower resistance of the voltage divider circuit through the impedance elements, thereby allowing the set value to be more minutely changed.

Figure 5:
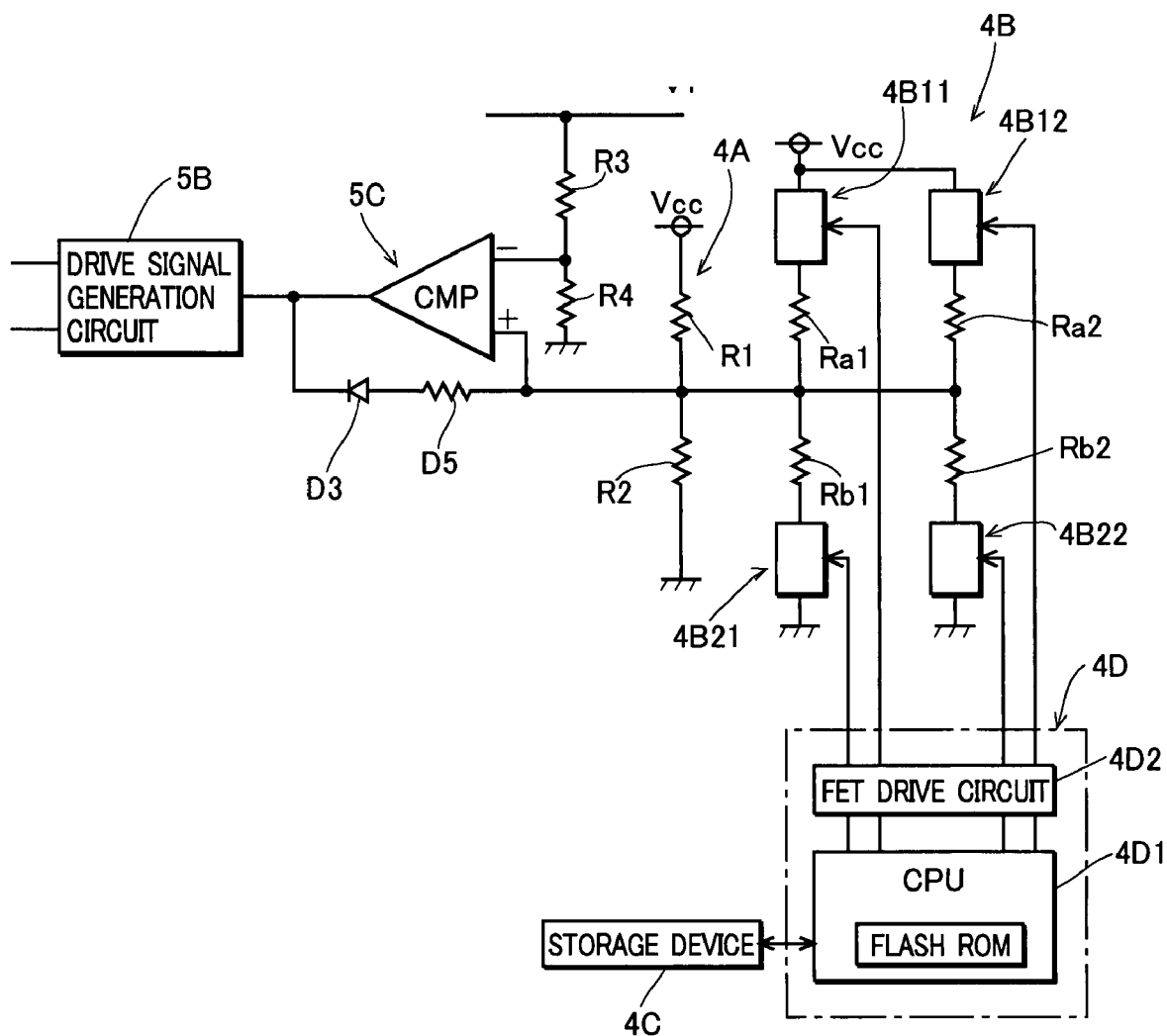
FIG. 5 is a schematic circuit diagram of a construction of essential portions of a fourth embodiment of the present invention.

For example, a construction as shown in FIG. 5 may be allowed. In the example in FIG. 5, a set value changeover switch 4B11 is connected in parallel across the upper resistance R1 of the voltage divider circuit 4A through a resistance Ra1, and a set value changeover switch 4B21 is connected in parallel across the lower resistance R2 of the voltage divider circuit 4A through a resistance Rb1. A set value changeover switch 4B12 is connected in parallel across the upper resistance R1 of the voltage divider circuit 4A through a resistance Ra2, and a set value changeover switch 4B22 is connected in parallel across the lower resistance R2 of the voltage divider circuit 4A through a resistance Rb2.

Comprised as described above, combinations of on/off of the set value changeover switches 4B11, 4B12, 4B21 and 4B22 allow the set value of the output voltage to be minutely changed.

In the embodiments, the present invention is applied to the power supply device comprised of the voltage converting portion that converts the input voltage supplied from the power supply portion into the output voltage to be supplied to the load, the output voltage setting portion that generates the output voltage setting signal for providing the set value of the voltage value of the output voltage, and the output voltage control portion that controls the voltage converting portion so as to make zero the deviation between the voltage value and the set value of the output voltage. However, the present invention may be widely applied to a power supply device comprised of an output voltage setting portion having a resistor in which a resistance value is adjusted in adjustment of the set value of the output voltage, and a control portion that controls to maintain the output voltage at the set value.

In any construction of the power supply device, the output voltage setting portion may be comprised of the set value changeover portion that has the plurality of set value changeover switches and turns on/off the set value changeover switches to change the resistance value of the resistor for adjusting the set value to change the set value of the output voltage, the storage device that stores information indicating an ON/OFF state appropriate for each set value changeover switch for keeping the voltage value of the output voltage within the specified range, and the set value changeover switch control portion that controls the set value changeover switches so as to bring each set value changeover switch into the state as indicated by the information stored in the storage device when the voltage is supplied from the voltage converting portion to the load.

Other power supply device to which the present invention can be applied includes, for example, a power supply device in which a resistor for adjusting (boosting) an output voltage is connected to a three-terminal regulator to output a voltage different from a specified voltage of the regulator, a power supply device using a switching regulator, or a power supply device in which a hybrid bridge circuit constituted by a diode and a thyristor is used as a voltage converting portion to perform phase control of the thyristor, thereby maintaining an output voltage at a set value.

Although the preferred embodiments of the invention have been described and illustrated with reference to the accompanying drawings, it will be understood by those skilled in the art that these are by way of examples, and that various changes and modifications may be made without departing from the spirit and scope of the invention, which is defined only to the appended claims.

What is claimed is:

1. A power supply device comprising:
    an output voltage setting portion that generates an output voltage setting signal for providing a set value of an output voltage; and
    an output voltage control portion that controls to maintain a voltage value of said output voltage at said set value,
    wherein said output voltage setting portion comprises:
    a set value changeover portion that has a plurality of set value changeover switches and turns on/off said set value changeover switches to change the set value of said output voltage;
    a storage device that stores information indicating an ON/OFF state appropriate for each set value changeover switch for keeping the voltage value of said output voltage within a specified range; and
    a set value changeover switch control portion that controls said set value changeover switches so as to bring each set value changeover switch into a state as indicated by the information stored in said storage device when said output voltage is supplied to the load.

2. The power supply device according to claim 1, wherein said output voltage setting portion has a resistor in which a resistance value is adjusted in adjustment of the set value of said output voltage, and
    said set value changeover portion is comprised so as to turn on/off said plurality of set value changeover switches to change the resistance value of said resistor to change the set value of said output voltage.

3. The power supply device according to claim 1, further comprising a voltage converting portion that converts an input voltage supplied from a power supply portion into the output voltage to be supplied to the load,
    wherein said set value changeover switch control portion is comprised so as to control said set value changeover switches so as to bring each set value changeover switch into a state as indicated by the information stored in said storage device when the voltage is supplied from said voltage converting portion to the load.

4. A power supply device comprising:
    a voltage converting portion that converts an input voltage supplied from a power supply portion into an output voltage to be supplied to a load;
    an output voltage setting portion comprising a voltage divider circuit that has an upper resistance and a lower resistance connected in series, and divides a constant DC voltage obtained from a constant-voltage power supply circuit to generate an output voltage setting signal for providing a set value of a voltage value of said output voltage; and
    an output voltage control portion that controls said voltage converting portion so as to maintain the voltage value of said output voltage at said set value,
    wherein said output voltage setting portion comprises:
    a set value changeover portion that has a plurality of set value changeover switches and turns on/off said plurality of set value changeover switches to change a voltage divider ratio of said voltage divider circuit to a different value to change said set value;
    a storage device that stores information indicating an ON/OFF state appropriate for each set value changeover switch for keeping the voltage value of said output voltage within a specified range; and
    a set value changeover switch control portion that controls said set value changeover switches so as to bring each set value changeover switch into a state as indicated by the information stored in said storage device when the voltage is supplied from said voltage converting portion to the load.

5. The power supply device according to claim 4, wherein each set value changeover switch provided in said set value changeover portion is connected in parallel with the upper resistance or the lower resistance of said voltage divider circuit through an impedance element having a resistance component.

6. The power supply device according to claim 4, wherein each set value changeover switch provided in said set value changeover portion is connected in parallel with a part of the upper resistance or a part of the lower resistance of said voltage divider circuit, and each set value changeover switch is turned on/off to change a resistance value of the upper resistance or a resistance value of the lower resistance of said voltage divider circuit.

7. The power supply device according to claim 3, wherein said voltage converting portion is comprised of a full-wave rectifier circuit constituted by n (n is an integer equal to or more than 2) rectifying diodes and n MOSFETs bridge-connected, the n rectifying diodes being placed on one of an upper side and a lower side of a bride and the n MOSFETs being placed on the other, and
    said output voltage control portion is comprised so as to simultaneously provide, to gates of said MOSFETs, a rectangular wave drive signal having a duty that changes according to a deviation between the voltage value and said set value of the output voltage obtained from said voltage converting portion so as to make the deviation zero, and simultaneously turn on/off said n MOSFETs.

8. The power supply device according to claim 4, wherein said voltage converting portion is comprised of a full-wave rectifier circuit constituted by n (n is an integer equal to or more than 2) rectifying diodes and n MOSFETs bridge-connected, the n rectifying diodes being placed on one of an upper side and a lower side of a bride and the n MOSFETs being placed on the other, and
    said output voltage control portion is comprised so as to simultaneously provide, to gates of said MOSFETs, a rectangular wave drive signal having a duty that changes according to a deviation between the voltage value and said set value of the output voltage obtained from said voltage converting portion so as to make the deviation zero, and simultaneously turn on/off said n MOSFETs.

* * * * *